United States Patent
Tan et al.

(10) Patent No.: US 7,461,298 B2
(45) Date of Patent: Dec. 2, 2008

(54) METHOD AND APPARATUS FOR DIAGNOSING MASS STORAGE DEVICE ANOMALIES

(75) Inventors: Cheng-Ping Tan, Fremont, CA (US); Con D. Phan, Milpitas, CA (US); Faris R. Hindi, Mountainview, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 526 days.

(21) Appl. No.: 11/217,642

(22) Filed: Aug. 31, 2005

(65) Prior Publication Data

US 2007/0050664 A1    Mar. 1, 2007

(51) Int. Cl.
*G06F 11/00* (2006.01)
(52) U.S. Cl. .......................... 714/42; 714/723

(58) Field of Classification Search ............... 714/42, 714/52, 722, 723
See application file for complete search history.

(56) References Cited

U.S. PATENT DOCUMENTS

| 4,456,995 | A | * | 6/1984 | Ryan | 714/723 |
| 5,511,164 | A | * | 4/1996 | Brunmeier et al. | 714/53 |
| 5,831,989 | A | * | 11/1998 | Fujisaki | 714/723 |
| 5,835,703 | A | * | 11/1998 | Konno | 714/42 |
| 7,272,758 | B2 | * | 9/2007 | Roohparvar | 714/723 |

* cited by examiner

*Primary Examiner*—Christopher S McCarthy
(74) *Attorney, Agent, or Firm*—Blakely, Sokoloff, Taylor & Zafman LLP

(57) ABSTRACT

A type of flaw present in a mass storage device can be inferred by examining the results of I/O operations performed on only a portion of the device, without testing or examining the entire device.

16 Claims, 6 Drawing Sheets

METHOD AND APPARATUS FOR DIAGNOSING MASS STORAGE DEVICE ANOMALIES

FIELD OF THE INVENTION

At least one embodiment of the invention relates to diagnosing mass storage device input/output (I/O) errors, and more specifically, to distinguishing among several possible sources of I/O errors.

BACKGROUND

Data are being created at an astonishing rate, and the utility of manipulating, correlating, and searching these data has given rise to a related problem: how to store the information so that large quantities of data can be saved reliably and accessed quickly. One approach that has proven effective is to provide a storage server: a special-purpose processing system used to store and retrieve data on behalf of one or more client processing systems ("clients").

A file server is an example of a storage server. A file server operates on behalf of one or more clients to store and manage shared files. It typically presents a uniform interface to data which are actually stored on one or more mass storage devices (such as magnetic or optical disks or tapes). The file server provides a layer of abstraction so that its clients can ignore the individual mass storage devices and treat the server as a single large (and often expandable) disk.

In a large scale storage system, it is inevitable that one or more individual mass storage devices will experience operational anomalies from time to time. For example, although a hard disk may have a typical access time of a few milliseconds, the system may detect that a read or write operation on the disk did not complete until a few seconds or tens of seconds after the operation was issued. Alternatively, a mass storage device may provide a status indicator to inform the storage system about a recently-completed I/O operation, and the status may show that, although the operation completed correctly, a retry was required or an error-correcting function was invoked. These anomalies may be true transient events, triggered by a chance sequence of timings and operations, or they may provide an important indication of impending device failure. Since it may not be economical to replace a device before it is known to be faulty, the ability to distinguish transient from predictive anomalies may be desirable.

SUMMARY OF THE INVENTION

A type of fault present in a mass storage device may be inferred by selecting a portion, but not all, of the device, performing a number of I/O operations on the portion, and analyzing the results of the I/O operations.

BRIEF DESCRIPTION OF DRAWINGS

Embodiments of the invention are illustrated by way of example and not by way of limitation in the figures of the accompanying drawings in which like references indicate similar elements.

DETAILED DESCRIPTION OF DRAWINGS

All mass storage devices have some physical structure, and many incorporate moving parts. The data stored on a device are embodied as a particular physical, magnetic, and/or electrical state of parts of the device. Thus, it is possible to identify one or more particular physical locations within the device where each stored bit resides. Furthermore, each bit will have neighbors that are located physically nearby (although the physical neighbors may not be dose in any logical sense).

Figure 1:
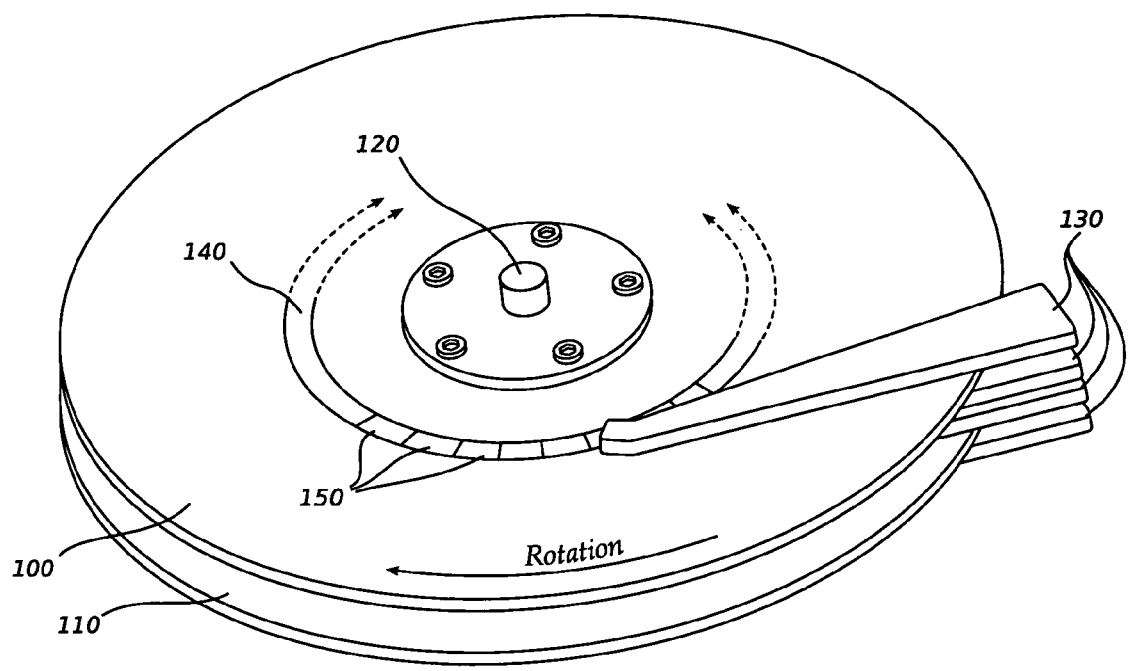
FIG. 1 shows a simplified component-level diagram of a hard disk drive.

For example, consider the structure of a typical hard disk depicted in FIG. 1. Data are recorded as patterns in a magnetic substance coating platters 100 and 110. The platters rotate about spindle 120, and the magnetic patterns are read and written by heads 130, which "fly" a small distance above (or below) platters 100 and 110. Heads 130 can move substantially radially across the platters, from near the spindle to near the outside edges, under the control of a servo mechanism (not shown). At any particular radial distance, the heads fly over a circular band 140 called a "track," and data are recorded along segments of the track 150 called "sectors." Within a sector, bits may follow each other both physically and logically (a typical sector may contain 512 bytes, or 4096 bits) but the bits in the sector located physically after a first sector may or may not be the same as the next logical 4096 bits. Instead, manufacturing, performance or other considerations may dictate that the next logical sector be located physically at some distance around the same track, on the other side of the platter, or on one of the other platters.

The physical layout of data on a disk is fixed by the hardware, firmware, and software that control the disk drive, and most drives provide a simple interface so that the host system can retrieve specific data by providing a logical block address ("LBA"), a whole number between zero and the total number of blocks the drive can store. The LBA permits the host to address a specific block without concern for the internal geometry or organization of the disk drive. The drive calculates a track, head and sector from the LBA, then moves the mechanism to the proper physical location to read (or write) the requested block. The host need not (and does not) control the physical position of data on the disk, but general knowledge of the LBA-to-physical-location process is important to the diagnosis procedure of embodiments of the invention.

Other mass storage devices have similar logical-to-physical layouts that are known or can be inferred. For example, many magnetic tape drives record data along helical stripes disposed at an angle to the tape's long edges, while many optical disk drives (such as CDROMs) record data along a single spiral track leading from near the center of the platter to the outside edge. For the purposes of embodiments of the present invention, exact information about the logical-to-physical layout of a mass storage device is not necessary. All that is required is sufficient information to plan a test regimen and interpret test results when investigating an anomaly that may signal an impending failure.

Figure 2:
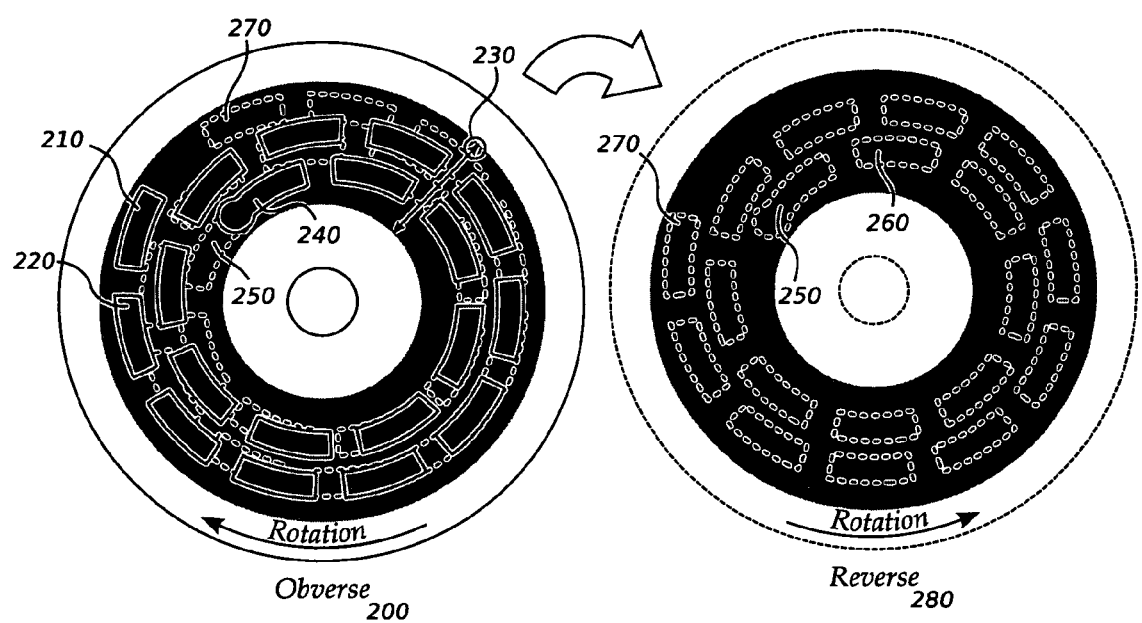
FIG. 2 shows an arrangement of sectors on the obverse and reverse sides of a hard disk platter.

Returning to the example of a hard disk drive, current-generation devices are known to have a small number of platters (generally from two to four or five), with heads on each surface (although one head may be used for administrative purposes and not for storing user data). Data are often recorded on the various tracks and surfaces in what is known as a serpentine ordering. As shown in FIG. 2, recording begins from the outside of the top surface 200 at sectors 210 and 220, and logically sequential blocks are recorded on a spiral track of decreasing radius. After several spiraling turns, recording has covered a circular band or "zone" 230 on the top surface of the platter, and after a final sector 240 in the zone, recording switches to another surface (perhaps the other side of the top platter 280). However, instead of returning to the outside of the zone for the next logical sector, successive logical sectors are recorded in a spiral tracks of increasing radius, starting with sectors 250 and 260 and spiraling out to sector 270. When the outside of the zone is reached, recording may switch to the top surface of the next platter. Note that sectors 210, 220, 240, 250, 260 and 270 are depicted much larger in relation to platter 200 than actual size. Similarly, zone 230 is shown occupying a much larger portion of the surface than an actual zone would cover.

Different hard disks may record data in different patterns. However, the example above illustrates a concept that is exploited by embodiments of the present invention: data are stored in mass storage devices in a regular way that bears some relationship to the physical structure of the device.

Figure 3:
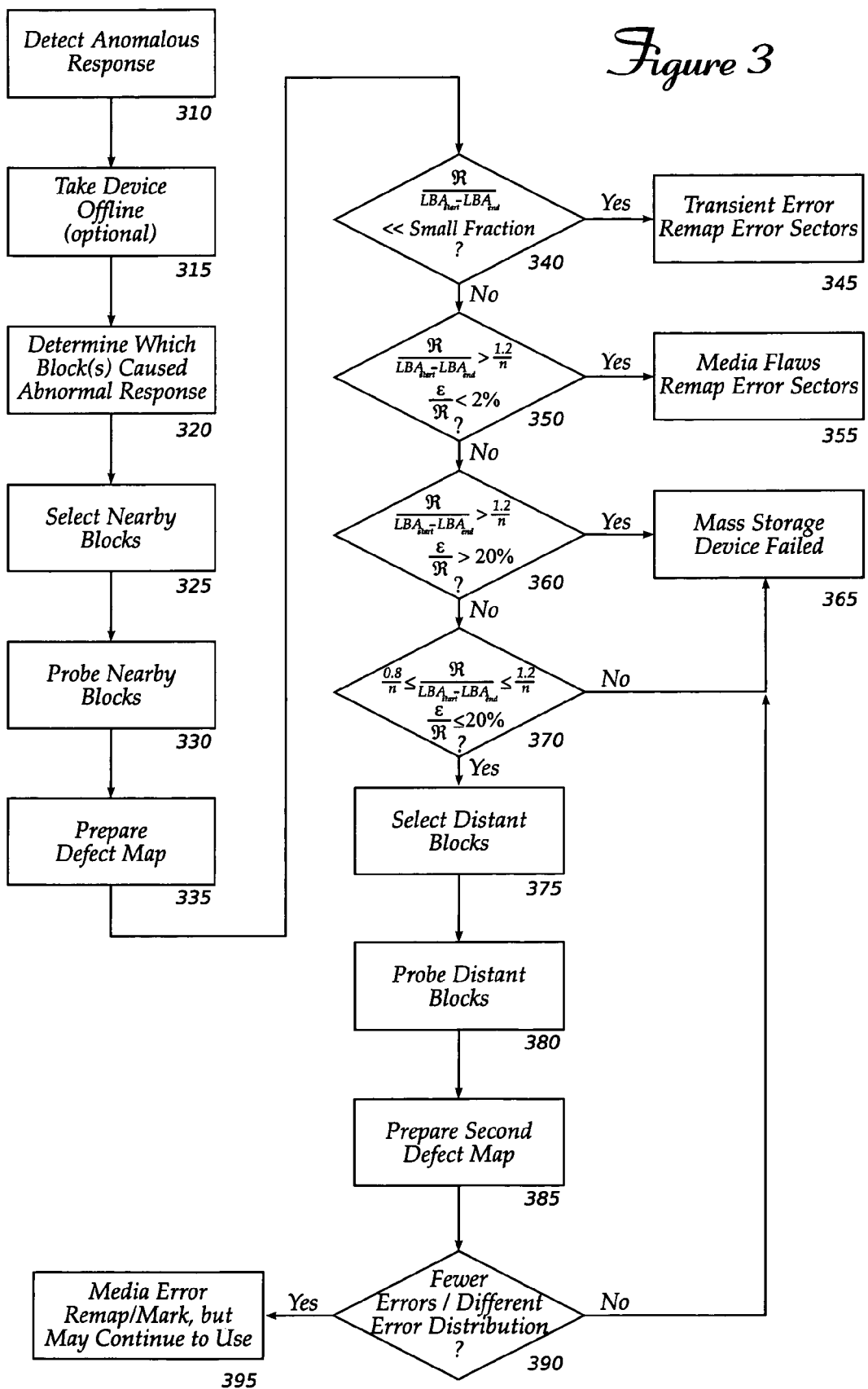
FIG. 3 is a flowchart of steps in diagnosing a mass storage device anomaly according to an embodiment of the invention.

Now consider a mass storage device that has exhibited an unexpected response to an I/O request. For example, a read or write operation completed long after it was expected to complete, or a status indicator showed that retries or error corrections were performed. Software on a storage server that controlled the device could detect the anomalous response and automatically perform diagnostics according to the flowchart of FIG. 3.

Upon detecting the anomalous response at 310, the server may remove the affected device from service temporarily (315). This is not essential (and may not be possible in all circumstances), but when the device can be taken off-line, it may reduce or eliminate adverse performance effects of the diagnostic processes on other operations being performed by the server.

Next, the server determines which block (or group of blocks) caused the abnormal response (320). For example, if the I/O request that completed slowly or with unusual indications was to read logical block numbers 600,000 to 600,004, the server selects those blocks as the center of an area of the mass storage device to examine for diagnostic purposes. When several sequential blocks are chosen as the "center" of an area, it is possible that the logical sequence will cross a point at which there is a physical discontinuity in the storage device's recording. In this example, perhaps block 600,002 is the final block in one zone of a platter, while block 600,003 is the first block in a zone located elsewhere on the drive. Nevertheless, by examining blocks located logically before and after the center block(s), adequate information can be collected to prepare a useful diagnosis.

Once a center is identified, the server selects a number of blocks that are "near" the center, based upon known or inferred parameters of the storage device (325). For the purposes of this operation, a block is "near" the center if there is some reason, grounded in the physical structure of the storage device, to expect that an anomaly of the center block would be more likely to affect the "near" block than to affect another block located further away.

After a number of nearby blocks have been selected, input and/or output operations are attempted on those blocks to probe, or attempt to discover more information about, possible damage related to the I/O anomalies seen on the center block(s) (330). Some mass storage devices permit I/O operations to be performed with reduced or eliminated automatic error recovery procedures; if available, these facilities can decrease the time required for diagnosis, as well as providing additional information (discussed below). Automatic error recovery may include, for example, automatic retries or the use of error detection and correction codes. Results from these probe operations are collected for subsequent analysis and diagnosis.

Turning now to the question of how many blocks should be probed to provide data for a useful diagnosis, symbols will be used to represent various quantities and parameters of interest, to highlight the fact that methods according to embodiments of the invention are generally applicable, and not limited to one or another of the specific examples discussed. These symbols are:

S . . . Sector size (often 512 or 520 bytes)
C . . . Hard disk capacity (in gigabytes ("GB"))
α . . . Design Areal Density Approximation (in GB/surface)
Z . . . Approximate number of zones per disk surface
n . . . Number of surfaces The size of a "read" operation, "R_IO_SIZE", is:

$$R\_IO\_SIZE \approx 10\% \text{ of zone capacity}$$
$$\approx 0.1 \frac{\alpha}{Z} \text{ (in } GB\text{)}$$
$$\approx 0.1 \frac{C}{nZ} \text{ (in } GB\text{)}$$
$$\approx \frac{0.1 \frac{C}{nZ} \times 10^9}{S} \text{ (in sectors)}$$
$$R\_IO\_SECT\_SIZE \approx 1 \times 10^8 \frac{C}{nZS}$$

In other words, by reading approximately 10% of the sectors in a zone, one may be reasonably certain of having exercised each of the mechanical components of the device, operating in the physical vicinity of the center sectors.

For example, a contemporary 72 GB, 10 K RPM Small Computer Systems Interface ("SCSI") or Fiber Channel ("FC") disk might have the following specific parameters:
Approximate α range: 7.2 to 9.0 GB/surface
C=72 GB
n=8 to 10
Z=18 to 20
R_IO_SIZE=36 to 40 MB A newer Advanced Technology Attached ("ATA") (or "IDE") hard disk providing 320 GB of storage operating at 5400 or 7200 RPM might have these parameters:
Approximate α: 40 GB/surface
C=320 GB
n=8
Z≈20
R_IO_SIZE ≈80 MB Note that in both of these examples, R_IO_SIZE is very much smaller than the total disk size. This implies that a useful diagnosis can be obtained without examining most or all of the device.

Figure 4:
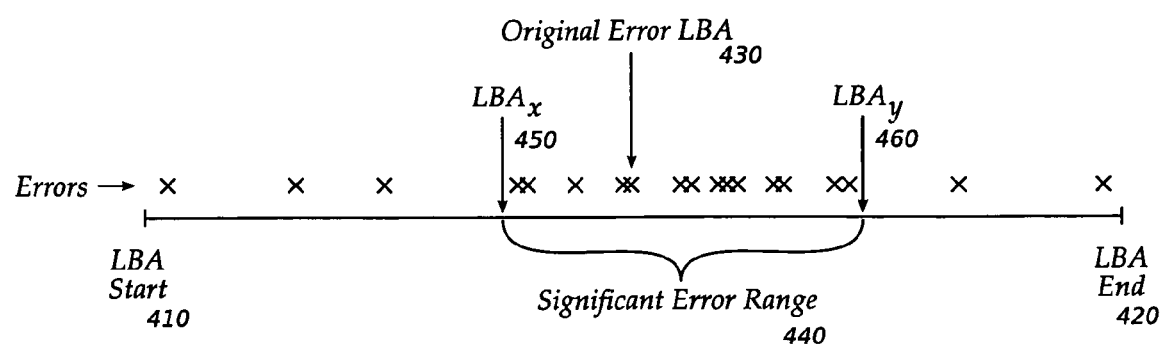
FIG. 4 shows a sample error distribution that might be obtained upon probing a portion of a mass storage device.

After the nearby blocks have been probed, software can prepare a defect map (335) such as the one shown in FIG. 4. Decision steps 340, 350, 360 and 370 distinguish the four cases that are described in Table 1, below.

If the number and pattern of errors suggest that the drive might have suffered media or head failure (case 4, decision 370), a second group of blocks, far from the original error and previously-selected "nearby" blocks, is selected (375) and probe I/O operations are performed (380). If a second defect map 385 shows a similar pattern of errors (390), the drive is likely to have suffered head failure and should be retired (365). Otherwise, it is more likely that the errors resulted from local media damage, and that the drive can remain in service (395).

The sample defect map depicted in FIG. 4 shows that blocks from LBA Start 410 through LBA End 420 were examined, and errors detected during probing are noted with xs. There may be isolated errors throughout the range, but a subset of the range 440 may show a significant concentration of errors. The beginning and end of range 440 are indicated as $LBA_x$ 450 and $LBA_y$ 460. In this hypothetical example, the original error LBA 430 is also within the range.

Once the significant error range 440 is identified, software can analyze the data to make a diagnosis. Table 1, below, shows the relationship between errors detected during the probe and the likely cause of the original anomalous behavior. In the table, $\Re$ represents the span of the significant error range (i.e. $LBA_y - LBA_x$), and $\epsilon$ represents the total number of errors detected. The fraction $$\frac{\Re}{LBA_{end} - LBA_{start}}$$

represents the portion of the total probed range where a significant number of errors was detected. It provides a discriminant, permitting the several cases described below to be distinguished.

Since embodiments of the invention are concerned with $$\frac{\Re}{LBA_{end} - LBA_{start}}$$

fractions between approximately 0.8/n and 1.2/n, one method of detecting such significant error ranges is to pass a "window" of an appropriate width across the defect map. If a large proportion of the errors fall within the window, then the window frames the significant error range. As a concrete example, consider a device with ten surfaces (n=10), for which 120,000 sectors were probed. If most of the errors (in excess of perhaps 75%) fall within a window of 9,600 to 14,400 LBAs, then $$\frac{0.8}{n} \leq \frac{\Re}{LBA_{end} - LBA_{start}} \leq \frac{1.2}{n}.$$

TABLE 1

| Case | Errors Detected | Diagnosis | Response |
|---|---|---|---|
| 1 | $\frac{\Re}{LBA_{end} - LBA_{start}} \ll SmallFraction$ | Transient errors | Remap or mark unusable |
| 2 | $\frac{\Re}{LBA_{end} - LBA_{start}} > \frac{1.2}{n}$ and $\frac{\epsilon}{\Re} < 2\%$ | Local media issue | Remap or mark unusable |

TABLE 1-continued

| Case | Errors Detected | Diagnosis | Response |
|---|---|---|---|
| 3 | $\frac{\Re}{LBA_{end} - LBA_{start}} > \frac{1.2}{n}$ and $\frac{\epsilon}{\Re} > 20\%$ | Device failure | Retire device |
| 4 | $\frac{0.8}{n} \leq \frac{\Re}{LBA_{end} - LBA_{start}} \leq \frac{1.2}{n}$ and $\frac{\epsilon}{\Re} \leq 20\%$ | Possible head or media failure | Further analysis indicated |

In case 1, the significant error range covers only a small fraction of the total range probed. The device has probably only experienced a transient error, and any damaged sectors may be remapped or marked unusable according to known methods.

In case 2, the significant error range covers more than 1.2/n of the total range probed, but the total number of errors is less than 2% of the number of sectors in the significant error range. This case can be adequately handled by remapping or marking damaged sectors as unusable.

Case 3 is similar to case 2 in terms of the breadth of the significant error range, but the number of errors is much greater, at more than 20% of the number of sectors in $\Re$. The device has probably experienced a serious failure, and should be retired.

In the final case, $$\frac{0.8}{n} \leq \frac{\Re}{LBA_{end} - LBA_{start}} \leq \frac{1.2}{n}$$

suggests that the significant error range covers about 1/n of the total probe range, which in turn suggests that either a local media issue or a head failure exists. This follows from the known physical structure of the device: if one surface (out of n) is damaged, then I/O operations that access nearby sectors are likely to fail in a ratio near 1/n. However, a failure in one of the n heads reading the n surfaces may also produce a similar failure ratio. To distinguish these causes, a second probe of blocks located at some distance from the original error LBA 430 should be performed. (The area examined by the second probe should not overlap the area examined by the first probe.) If the results of this second probe show a similar pattern of errors, then it is likely that a disk head or similar component has become damaged and the drive should be replaced. However, if the second probe shows few errors and/or a different distribution of errors, then the problem is more likely to be a local media issue in the originally-probed area, despite the detection of a larger total number of errors than case 2. In this case, it may be acceptable to continue using the device instead of replacing it.

The specific values given in Table 1 have been empirically determined to be useful for diagnosing mass storage devices such as hard disk drives. However, embodiments of the invention may produce adequate diagnoses even when the decision functions are adjusted away from the values in Table 1. For example, in some embodiments, significant error ranges between 0.65/n and 1.35/n can indicate the sort of physical problem that can be identified by the invention; and in other embodiments, it may be acceptable to continue using devices with error rates somewhat in excess of 20%.

Note that this diagnostic method does not require testing and analysis of the entire mass storage device. Such comprehensive testing could, of course, be performed, but the great time cost of doing so may outstrip any savings obtained by identifying (and continuing to use) devices that have transient, isolated, or localized faults. Thus, embodiments of the invention obtain more useful information about a storage device with less investment of time and effort than a full media scan requires.

Other types of mass storage devices with different physical characteristics or operational principles may require alternate methods of selecting sectors "near" the center sectors, and different failure modes may be indicated by the error rate observed during testing. However, different instances of the same type of device, and also different devices that operate on the same principle, are likely to show similar correspondence between error rates and failure modes. Therefore, this method can be used to diagnose other types of devices by analyzing the device (or class of devices) and observing the relationship between error rates and known failures.

Figure 5:
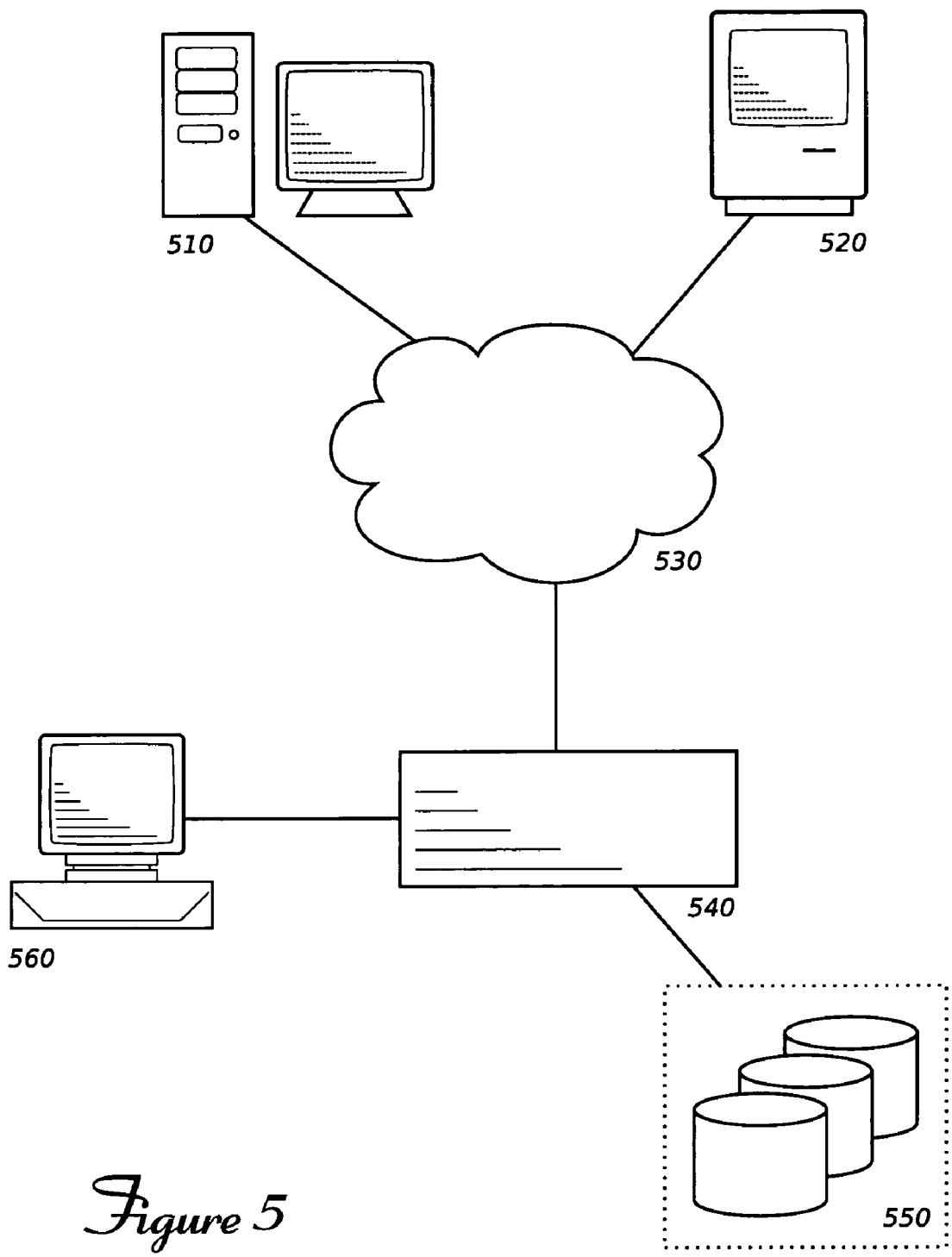
FIG. 5 shows an environment including a network storage server that may be able to make use of an embodiment of the invention.

An environment including a storage server that could benefit from an embodiment of the invention is shown in FIG. 5. Clients 510 and 520 communicate with storage server 540 through network 530. Storage server 540 is connected to a plurality of mass storage devices 550, and can provide file or block storage services to clients 510 and 520. Computer system 560 may be useful as an administrative console for configuring, managing and monitoring storage server 540. Administrative console 560 may be used to initiate diagnostic procedures incorporating embodiments of the invention, or to review the results of such diagnostic procedures.

Figure 6:
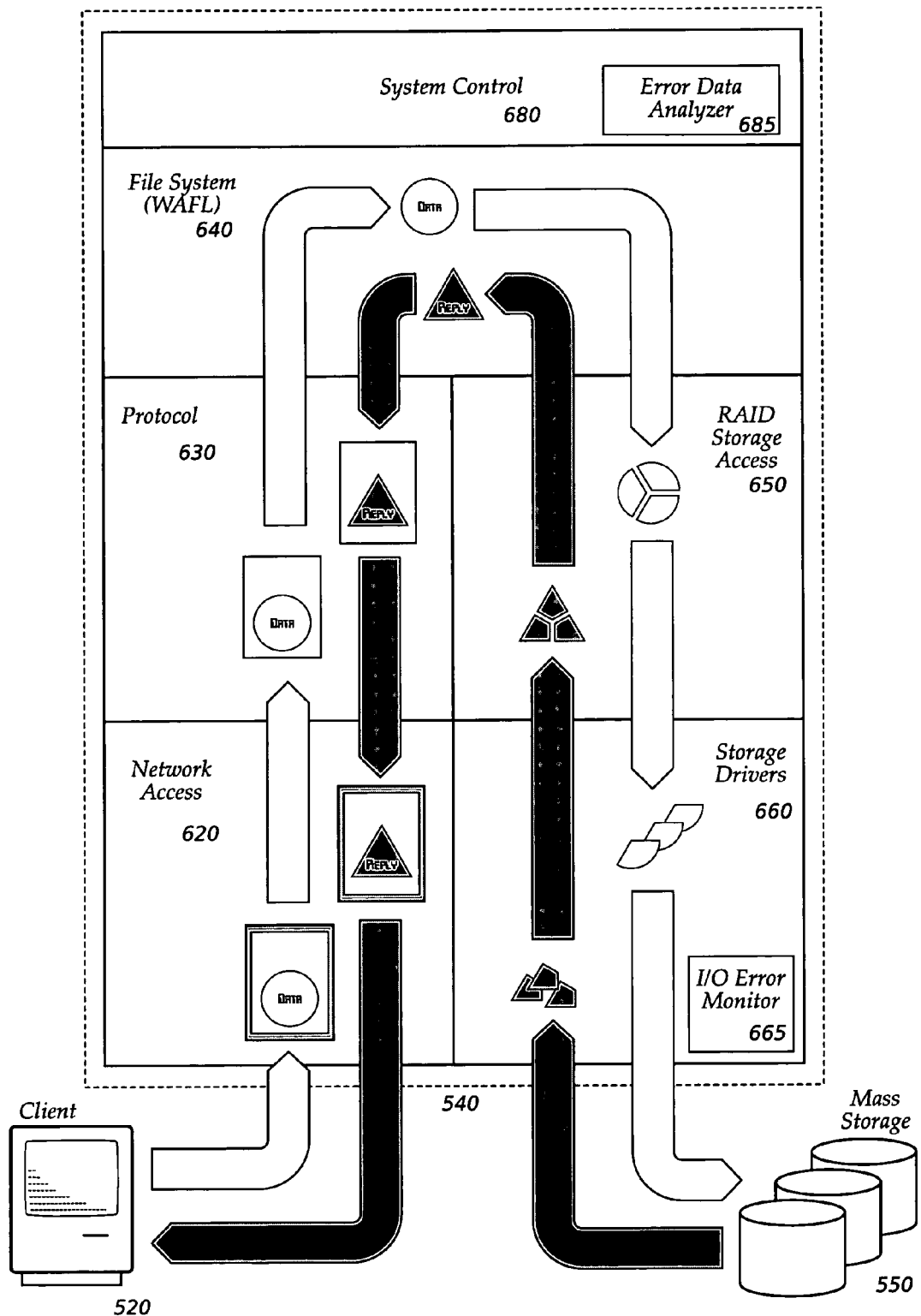
FIG. 6 is a block representation of the logical components comprising a storage server.

FIG. 6 is a diagram of logical data flow from a client 520 through a storage server 540 to several mass storage devices 550. A request from the client may pass through various logical layers as shown by the white arrows, including network access layer 620, protocol layer 630, file system 640, RAID storage access layer 650, and storage driver layer 660. Data from mass storage devices 550 may flow in the other direction, as shown by the gray arrows. Storage drivers 660 may be well-situated to monitor I/O requests to the mass storage devices 550; such monitoring may be performed by a software component indicated as element 665. The monitoring component 665 can report errors and anomalies to system control layer 680 for analysis according to an embodiment of the invention. The analysis itself may be performed by software component 685, which may be invoked by or may report results to the administrative console 560 mentioned in reference to FIG. 5.

Embodiments of the invention can also be used to analyze error data collected during normal and/or maintenance operations, and not only error data collected during a specific testing or probing procedure. For example, storage server 540 may implement a "scrubbing" process to read and verify data on its mass storage devices 550 even when no client request to access the data has been made. This process might occur during times when the server is otherwise idle, and could involve reading sectors at various storage device locations. Any errors detected during these reads could be noted, and the collected data periodically examined for the error patterns previously described.

It should be apparent that methods according to the present invention can also be used by systems other than storage servers. In fact, any machine or collection of machines that use one or more mass storage devices can apply the methods herein to reduce the financial and time impact of mass storage device degradation and failure. Some examples of such machines include disk drive/system burn-in test beds and personal video recorders (PVR) such as the commercially-available Tivo®. Embodiments of the invention may improve the ability of systems to perform real-time data storage error trend detection and increase the robustness of self-healing file systems.

Other embodiments of the invention may refine the probing process by adjusting the thoroughness of error correction measures to be applied automatically by the mass storage device. For example, in a normal read operation, the storage device may attempt a number of retry operations interspersed with drive resets, and/or may attempt to use error correction codes (ECC) to retrieve data from a distressed sector. Other storage devices may have different error recovery techniques that can be applied automatically. However, some devices permit the system to limit or select error recovery options that the storage device may use. By limiting the options a device is permitted to use, the system can reduce the amount of time spent in the probing process (as noted earlier), but it may also be able to obtain more detailed information about a sector than simply "readable" or "unreadable." For example, a sector may be readable with ECC, but not without. Or a sector may be readable only after retries. This information may provide additional clues to indicate the nature of the anomaly.

An embodiment of the invention may be a machine-readable medium having stored thereon instructions which cause a processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROM), Read-Only Memory (ROM), Random Access Memory (RAM), Electrically-Erasable Programmable Read-Only Memory (EEPROM or "Flash"), and transmission over network such as a switched or point-to-point network.

The applications of the present invention have been described largely by reference to specific examples and in terms of particular allocations of functionality to certain hardware and/or software components. However, those of skill in the art will recognize that the methods can also be performed by software and hardware that distribute the functions of embodiments of this invention differently than herein described. Such variations and implementations are understood to be apprehended according to the following claims. It should be noted that references to "an" or "one" embodiment in this disclosure are not necessarily to the same embodiment, and such references mean "at least one."

We claim:

1. A computerized method comprising:
    selecting a first portion of a storage available in a mass storage device, the first portion encompassing less than all of the storage available in the mass storage device;
    performing a first plurality of I/O operations on the first portion to obtain a corresponding first plurality of I/O results;
    inferring a type of flaw present in the mass storage device based on the first plurality of I/O results, wherein the first plurality of I/O results indicates more than one possible type of flaw present in the mass storage device;

selecting a second portion of the storage available in the mass storage device, the second portion not co-extant with the first portion;

performing a second plurality of I/O operations on the second portion to obtain a corresponding second plurality of I/O results; and distinguishing among the more than one possible type of flaw present in the mass storage device based on the second plurality of I/O results.

2. The computerized method of claim 1, wherein the type of flaw is one of transient error, local media damage, storage device failure, and possible head or media failure.

3. The computerized method of claim 1 wherein a size of the first portion of the storage is approximately equal to $$1 \times 10^8 \frac{C}{nZS},$$

where C is a total capacity of the mass storage device in gigabytes (GB), n is a number of surfaces, Z is an approximate number of zones per surface, and S is a sector size.

4. The computerized method of claim 1, further comprising preparing a first defect map of errors detected while performing the plurality of I/O operations and identifying a range containing a significant concentration of errors.

5. The computerized method of claim 4 wherein a span of the range containing a significant concentration of errors is divided by a size of the first portion of storage, the resulting fraction being used to infer a type of flaw present in the mass storage device.

6. The computerized method of claim 5 wherein a fraction between approximately 0.8/n and approximately 1.2/n, where n is a number of surfaces, and a number of errors not exceeding approximately 20% of a span of the significant error range, indicates two different flaws, the method further comprising:

comparing the first defect map for the first plurality of I/O operations with a second defect map for the second plurality of I/O operations.

7. The computerized method of claim 1 wherein the mass storage device is a hard disk drive.

8. A computerized method comprising:

detecting an anomalous condition occurring during a data transfer to or from a mass storage device;

identifying a first zone near a location of the data transfer;

executing a first plurality of data transfers from the first zone;

analyzing a first plurality of results obtained from the first plurality of data transfers;

determining a likely cause of the anomalous condition based upon the first plurality of results, wherein the first plurality of results indicates more than one likely cause of the anomalous condition;

identifying a second zone near the location of the data transfer, the second zone not co-extant with the first zone;

executing a second plurality of data transfers from the second zone;

analyzing second plurality of results obtained from the second plurality of data transfers; and distinguishing among the more than one likely cause of the anomalous condition based on the second plurality of results.

9. The computerized method of claim 8 wherein the first zone contains less than all of the data contained in the mass storage device.

10. The computerized method of claim 8 wherein analyzing is calculating a fraction equal to a span of a significant number of errors detected during the plurality of data transfers divided by a total number of data transfers.

11. A system comprising:

a programmable processor coupled to a bus;

a memory coupled to the processor through the bus;

a plurality of mass storage devices coupled to the processor; and instructions executed by the processor from the memory to cause the processor to:

detect an unusual condition of one of the plurality of mass storage devices;

identify a location associated with the unusual condition;

define a first neighborhood near the location;

perform first data transfers from the first neighborhood;

diagnose a cause of the unusual condition based upon a first plurality of results obtained from the first data transfers from the first neighborhood, wherein the first plurality of results indicates more than one likely cause of the unusual condition;

define a second neighborhood near the location, the second neighborhood not co-extant with the first neighborhood;

perform second data transfers from the second neighborhood; and distinguishing among the more than one likely cause of the unusual condition based on a second plurality of results obtained from the second data transfers from the second neighborhood.

12. The system of claim 11 wherein the unusual condition is a delayed response to an I/O request.

13. The system of claim 11 wherein the unusual condition is an abnormal status code received from the one of the plurality of mass storage devices.

14. The system of claim 11, further comprising a communication interface to exchange data with a client.

15. The system of claim 14 wherein a function of the system is to provide data storage services to the client.

16. A computer-readable storage medium containing instructions that, when executed by a processor, cause the processor to perform operations comprising:

detecting an abnormal condition occurring in connection with an I/O operation on a mass storage device;

selecting a first portion of the mass storage device centered on a location accessed by the I/O operation;

performing first test input operations on the first portion of the mass storage device;

collecting a first plurality of results from the first test operations;

diagnosing a possible fault in the mass storage device based on the first plurality of results, wherein the first plurality of results indicates more than one possible type of fault in the mass storage device;

selecting a second portion of the mass storage device centered on the location accessed by the I/O operation, the second portion not co-extant with the first portion;

performing a second test input operations on the second portion of the mass storage device;

collecting a second plurality of results from the second test operations; and distinguishing among the more than one possible type of fault in the mass storage device based on the second plurality of results.

* * * * *